[11] 3,628,078

[72] Inventors Jean Pierre Galves;
Aldo Moro, both of Paris, France
[21] Appl. No. 823,290
[22] Filed May 9, 1969
[45] Patented Dec. 14, 1971
[73] Assignee Thomson-CSF
[32] Priority May 31, 1968
[33] France
[31] 153503

[54] VARIABLE-PITCH FOCUSING GRID FOR COLOR TELEVISION TUBES

1 Claim, 13 Drawing Figs.

[52] U.S. Cl. 313/86, 313/92 B, 313/349
[51] Int. Cl. H01j 1/46, H01j 31/20, H01j 29/02
[50] Field of Search 313/92 PD

[56] References Cited

UNITED STATES PATENTS 2,793,319 5/1957 Nunan 313/92 X

*Primary Examiner*—Robert Segal
*Attorney*—Cushman, Darby & Cushman

ABSTRACT: A focusing grid for color television tubes, is formed by a flat sheet, parallel to the screen, of wires parallel to the phosphor strips of the screen, the pitch of which wires varies from the center towards the edges of the screen in accordance with a predetermined law.

VARIABLE-PITCH FOCUSING GRID FOR COLOR TELEVISION TUBES

The present invention relates to focusing grids for color television tubes. One object of the invention is to create a grid which, without requiring any auxiliary correcting electrode, ensures that, during the scanning, the beam corresponding to each color is centered on the phosphor strip of the same color, deposited upon the screen.

With a view towards better setting forth the invention, a few considerations, relating to color television tubes, will be first recalled.

In accordance with one current concept, a color television tube essentially comprises in the path of the beam between the green, blue and red electron-guns, on the one hand, and the screen on the other, an accelerator electrode, a color purity correcting electrode, and a focusing grid, parallel to the screen, formed of a flat sheet of mutually parallel wires and located at some centimeters from the screen.

Strips of green, blue and red phosphors of equal and constant width, parallel to the wires of the grid, are deposited in a regularly repeated sequence over the whole of the screen.

The electrons emanating from the electron guns are accelerated by the anode, and prior to reaching the screen, traverse the focusing grid whose function is to concentrate the beam in such a way as to reduce to a minimum the area of its impact on the screen.

As far as the electrode for correcting the color purity is concerned, it is made necessary by the fact that when, in the course of the scanning, the angle of incidence of the beam on the screen varies, the position of its point of impact in relation to the center of the corresponding color strips varies and can, if not corrected, encroach upon an adjacent band of different color.

The use of this correcting electrode creates difficulties. The main difficulties are the following ones: an additional voltage source is necessary; also the shape of this electrode has to be determined with great accuracy, which is a rather difficult task, if the desired correction is to be achieved, although it is in fact difficult to achieve an adequate color correction throughout the whole of the screen surface.

It is the object of the present invention to avoid such difficulties, by avoiding the necessity of using a color-correcting electrode.

According to the invention there is provided in a color television tube comprising three electron guns for emitting beams corresponding to fundamental color and the screen of which is covered with regularly repeated phosphor strips of the same colors of equal and constant width, a focusing grid comprising a flat sheet, parallel to said screen, of wires parallel to said strips, the pitch of said grid varying from the center towards the edges in accordance with a predetermined law.

For a better understanding of the invention and to show how the same may be carried into effect reference will be made to the drawing accompanying the ensuing description and in which.

In all the FIGS., similar symbols designate similar elements.

Figure 1:
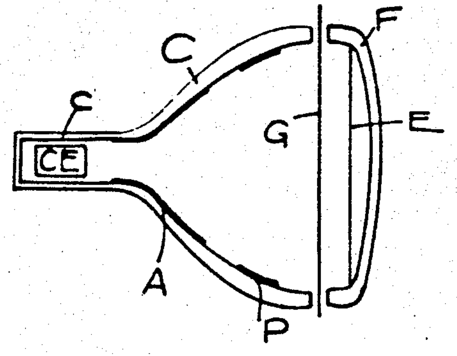
FIG. 1 illustrates, schematically and in section, the main elements of a color television tube to which the invention is applicable.

FIG. 1 shows schematically and in section, the main elements of a color television tube to which the invention is applicable. The front face F of the cone C of the tube envelope carries a screen E. In the neck $c$ of the tube there are located the electron-guns CE. A focusing grid G, an anode A and a color-correcting electrode P are also provided.

The latter two electrodes are produced, in the case of the tube of FIG. 1, in the form of metal deposits on the internal face of the cone C.

In operation, the electrons emitted by the guns CE are accelerated towards the screen E by the anode A which is raised to a potential in the order of 10,000 volts. During their trajectory towards the screen E, which is raised to the highest potential of the tube, for example 25,000 volts, they pass through the grid G which is at a potential of between 7,000 and 8,000 volts.

Figure 2:
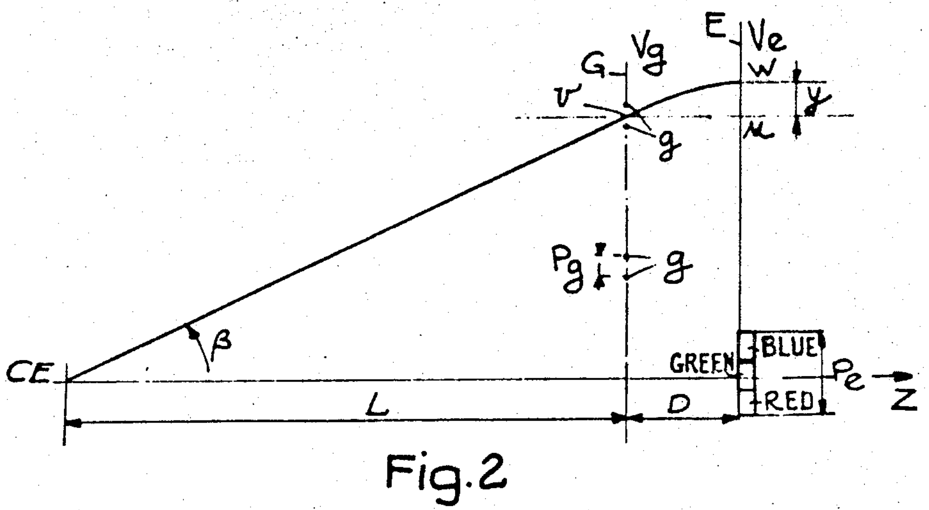
FIG. 2 shows the trajectory of an electron beam in the plane of symmetry perpendicular to the FIG. 1.

The trajectory of the electrons is illustrated in FIG. 2 which corresponds to a section of the tube of FIG. 1, through the central plane perpendicular to the plane of FIG. 1. In this FIG. Z designates the tube axis; $g$ the wires of the grid G whose constant pitch (distance between the axes of two consecutive grid wires $g$) is represented by $Pg$; three strips of Blue, Green and Red phosphors parallel to the grid wires and of equal and constant width, are deposited upon the screen E; $Pe$ is the pitch of the phosphor strips, that is to say the width of a set or triad of three phosphor strips; $Vg$ and $Ve$ respectively designate the grid and screen voltages in relation to the electron-guns; L is the distance between the guns CE and the grid G; D the distance between the grid G and the screen E; $\beta$ the angle between the beam of electrons issuing from one of the guns and the axis Z.

The beam of electrons issuing from one of the electron-guns CE is accelerated by the high voltage of the anode and initially follows a flat trajectory between the electron-gun and the grid G. In passing the grid G it is deflected in the high-strength field prevailing in the space between the grid G and the screen E. This tends to deflect it towards the axis Z, $Ve$ being higher than $Vg$. The distance $y$ is the distance between the point $u$ on the screen, which is opposite the point $v$ at which the beam passes through the grid, and the point of impact $w$ of the beam on the screen E. The distance $y$ is a function of the angle $\beta$ and is therefore not constant during scanning. The result is that if, at given operating voltages and with a given constant grid pitch and a given phosphor strip pitch, coincidence between the point of impact $w$ on the screen of a beam corresponding to a given color, and the center of a phosphor strip of the same color, is achieved for one value of $\beta$, it will generally not be achieved for other values of $\beta$. This does not matter much as long as the interval between the said point of impact and said center remains substantially less than half the width of a phosphor strip, but becomes a serious problem as soon as this interval exceeds said value, in which case a beam corresponding to a given color will encroach upon a phosphor strip of different color.

It is for this reason that in conventional tubes an additional electrode is provided, namely the color-correcting electrode P, shown in FIG. 1, the function of which is to correct the trajectories of the electrons in the space between the electron-guns and the grid, in order to bring back the impact point of the beam towards the center of the corresponding color strip.

It is an object of the invention to avoid the drawbacks associated with this kind of correcting electrode.

The quantity $y$, hereinbefore defined is deduced from fundamental considerations of electron motion, and, using the notation of FIG. 2, can be expressed as:

$$y=\frac{D}{K}\sin 2\beta\left(\sqrt{1+\frac{K}{\cos^2\beta}}-1\right) \qquad (1)$$

wherein K is equal to $$\frac{V_e-V_g}{V_g}$$

In one known television tube, of the general design indicated in the diagram of FIG. 1, that is to say having a constant-pitch grid G and identical constant-width phosphor strips, the error to be corrected is defined by $$\Sigma=nP_g-nP_e+y \quad (2)$$

$nP_e$ being the distance of the $n^{th}$ phosphor strip of a given color, from the axis Z, $nP_g$ being the distance between the center of the $n^{th}$ mesh of the grid and the same axis, and $y$ the quantity hereinbefore defined; Σ can also be written, in the case of constant-pitch grid and phosphor strips:

$$\epsilon=L\alpha\tan\beta+\frac{D}{K}\sin 2\beta\left(\sqrt{1+\frac{K}{\cos^2\beta}}-1\right) \qquad (3)$$

wherein $\alpha=1-P_e/P_g$, which quantity should be negative ($P_e>P_g$) in order that Σ can be cancelled out and the desired coincidence achieved for at least one value of β, different from zero.

Figure 3:
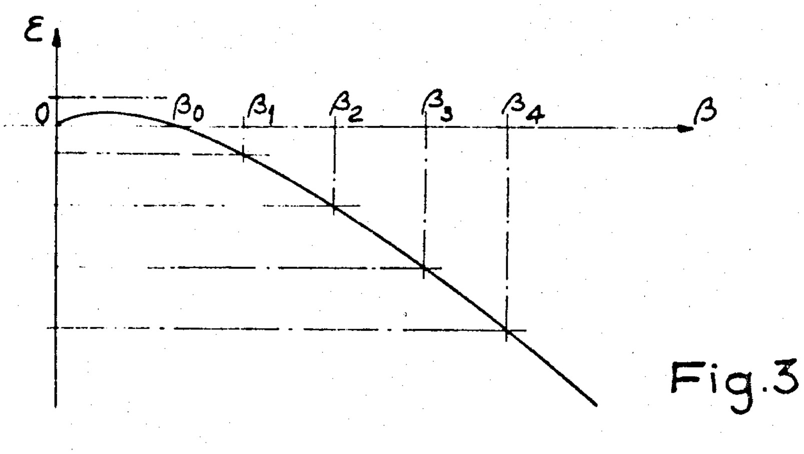
FIG. 3 illustrates the theoretical curve giving, as a function of the angle $\beta$ between the beam of a given color and the tube axis, the interval $\Sigma$ between the point of impact on the screen of this beam, when it propagates through the mash $n$ of the grid, and the center of the $n^{th}$ phosphor strip of the same color.

FIG. 3 illustrates, for a given anode voltage VA, the variations of Σ as a function of β(axes β, Σ) in one half of the tube.

Figure 4:
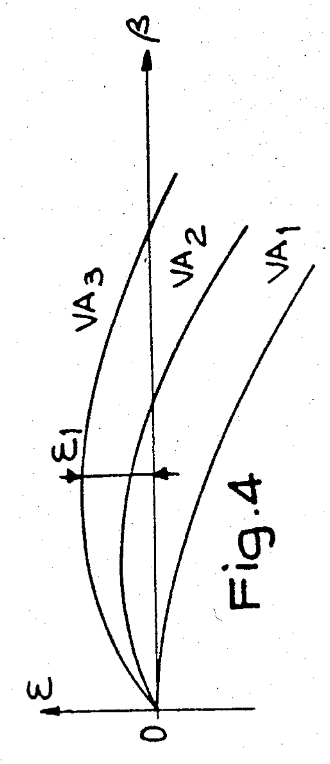
FIG. 4 illustrates a family of curves such as those shown in FIG. 3, corresponding to different anode voltages, in the vicinity of the origin.

It can be seen from this FIG. that the quantity Σ starts by rising and then falls off, remaining positive up to a value $\beta_o$, at which point it is cancelled out. It then continues to increase in absolute value in the negative-going sense. If, other things being equal, the anode voltage rises, the curve is displaced towards negative values of Σ as shown by the family of curves of FIG. 4 for decreasing anode voltage values $VA_3$, $VA_2$ and $VA_1$.

To put it another way, returning to FIG. 3 it will be seen that, for an angle β equal to $\beta_o$, the correction is 100 percent (Σ is zero), not to speak of the value $\beta=o$, corresponding to the screen center, that is to say that the point of impact of a beam corresponding to a given color, is precisely at the center of the phosphor strip. For $\beta>\beta_o$, the interval between this point of impact and the strip center increases and can reach the width of one or more phosphor strips. For β values between zero (tube axis) and $\beta_o$, the same phenomenon can occur in a greater or lesser degree depending upon the anode voltage, as indicated by the family of curves of FIG. 4.

Figure 5:
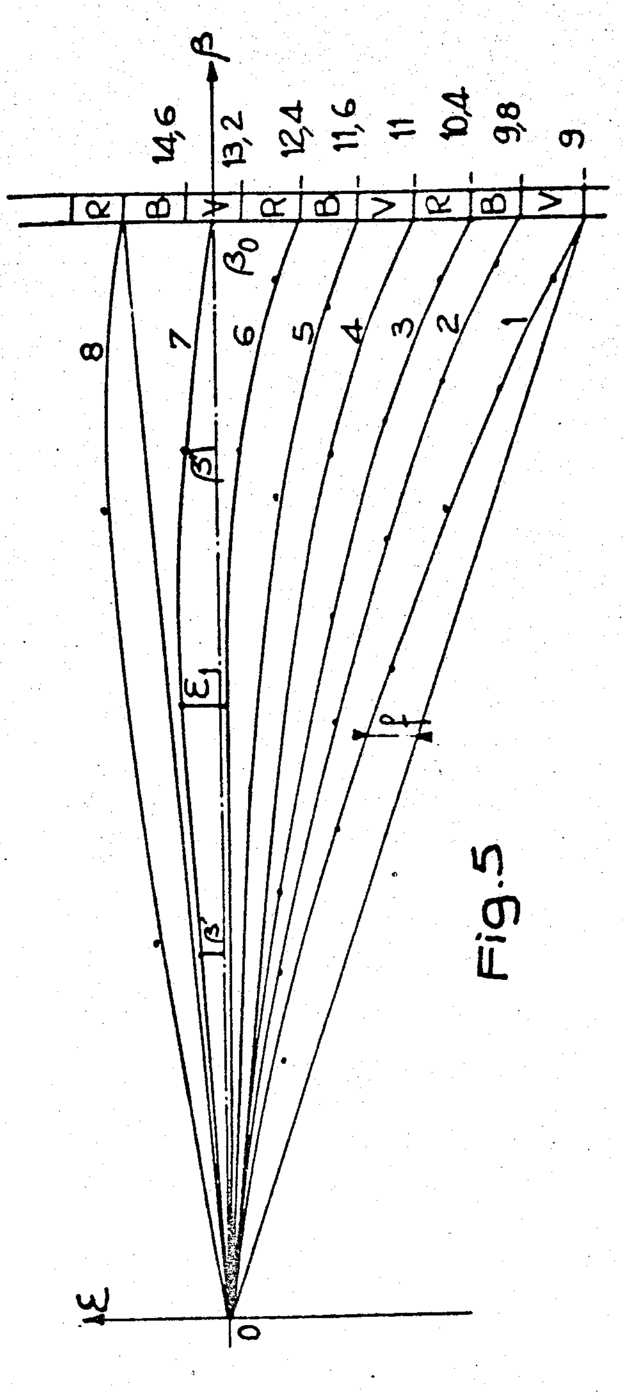
FIG. 5 illustrates the same family of curves obtained experimentally from a tube such as that to which corresponds FIG. 2.

FIG. 5 illustrates the family of curves for Σ(β) as obtained experimentally with the tube of FIG. 1. On a line parallel to the axis of the ordinates, to the right of the FIG., the phosphor strips of the screen have been reproduced.

The eight curves numbered 1 to 8 correspond to the eight values of the anode voltage VA in kv. indicated on the FIG. It will be seen from this FIG. that in the case of curve 7 and considering, for example, a green beam, the point of impact of the beam is at the center of the green strip for $\beta=\beta_o$ and within the green strip for all β values comprised on the one hand between 0 β', and on the other hand between β'' $\beta_o$, while it is in the adjacent blue strip for all the values of β between β' and β''. Therefore, for monochromatic green emission, there is a blue zone between two green zones.

In the case of the curve 8 the phenomenon is even more marked and, assuming again monochromatic green emission, the two other colors occur successively from the center towards the periphery of the screen.

The same applies again in the case of the curves 1 to 6, where either of the colors blue and red, or even both, may appear several times between the center and the edge of the screen.

The maximum interval $\Sigma_1$ (FIG. 4 and curve 7 in FIG. 5), between the point of impact of the beam and the center of the phosphor strip of the same color, gives the maximum amplitude of the correction to be effected. This amplitude is also virtually equal to the rise of any of the curves of the family. It will be taken, for example, from the curve 7 or better still from any of the underlying curves plotted through a larger number of points (corresponding to the largest number of colors appearing between the center and periphery of the screen), thus giving a more accurate result.

In accordance with the invention, the correction of the error Σ is effected by using a grid having a variable pitch from the center to the periphery of the screen. In a preferred embodiment of the invention, this correction is achieved with good approximation by using a grid pitch which varies in accordance with an arithmetic progression as a function of the order of the grid wire, said arithmetic progression being defined as follows:

The anode voltage being selected, all the other parameters being so that Σ is cancelled out at the edge of the screen (β corresponding to the maximum angle of scan), and $P_o$ designating the pitch of the constant-pitch grid which is to be corrected, the pitch $P_n$ of the grid in accordance with the invention is given as a function of the position number $n$ of the grid wire considered, by $$P_n=P_m+np \quad , \quad (4)$$

where:

—$P_m$ designates the pitch $P_o$ of the constant-pitch grid which would have the same number of wires as the variable-pitch grid, reduced by the quantity $$\frac{\epsilon_1}{N}$$

, $\Sigma_1$ being that maximum interval between the point of impact of a beam and the center of the nearest strip of the same color to which the constant-pitch grid gives rise (we have $$P_m=P_o-2\frac{\epsilon_1}{N})$$

—and $p$ the quantity defined by $$\Sigma_1=N^2p12 \quad , \quad (5)$$

$N$ being the order of the constant-pitch grid wire for which the maximum interval $\Sigma_1$ is obtained so that $$P_n=\left(P_o-2\frac{\epsilon_1}{N}\right)+2\frac{\epsilon_1}{N^2}n$$

For example, for the tube of FIG. 2 one can read off from the diagram of FIG. 5 an $\epsilon_1$ value approximately equivalent to the width of phosphor strip, or 33/100 mm. However, the maximum error $\Sigma_1$ occurs approximately halfway between the center and the edge of the screen, that is to say, with a grid having 200 wires from the center to the edge of the screen, at the $100^{th}$ wire ($N$=100). From (5) one therefore obtains:

$$p=2/10^4\times 33/100\text{ mm.}=6.6/100\text{ microns.}$$

Figure 8:
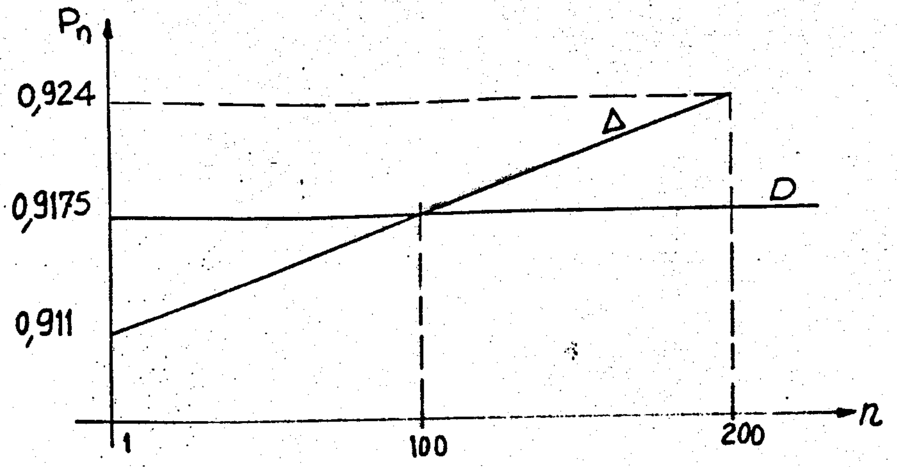
FIG. 8 is an explanatory diagram.

The pitch $P_o$ being itself equal to 917.5 microns, the variable-pitch grid of the invention will have a pitch varying from 917.5 microns at a point halfway between the center and the edge of the screen, to 917.5−6.6/100×100 microns at the center of the screen and 917.5+6.6/100×100 microns at the edge as indicated in the diagram (straight line Δ) of FIG. 8, this giving $P_n$ as a function of the position number $n$ of the wire counted from the screen center; the final FIGS. thus being respectively 911 and 924 microns approximately. The straight line D corresponds to the constant-pitch case.

Figure 6:
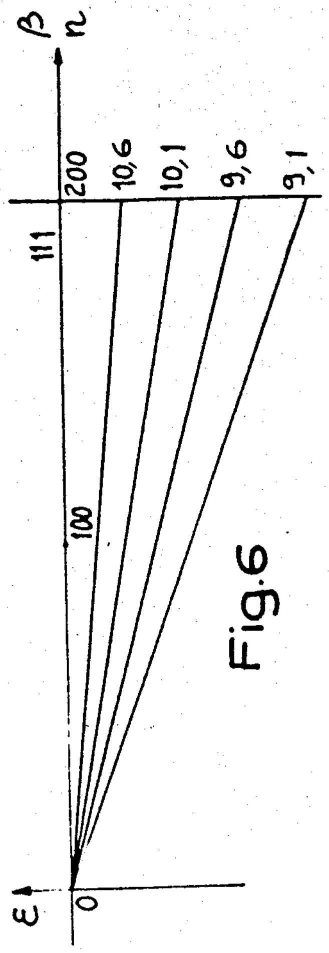
FIG. 6 illustrates the family of curves such as that of FIG. 4 in the theoretical form after correction in accordance with the present invention.
Figure 7:
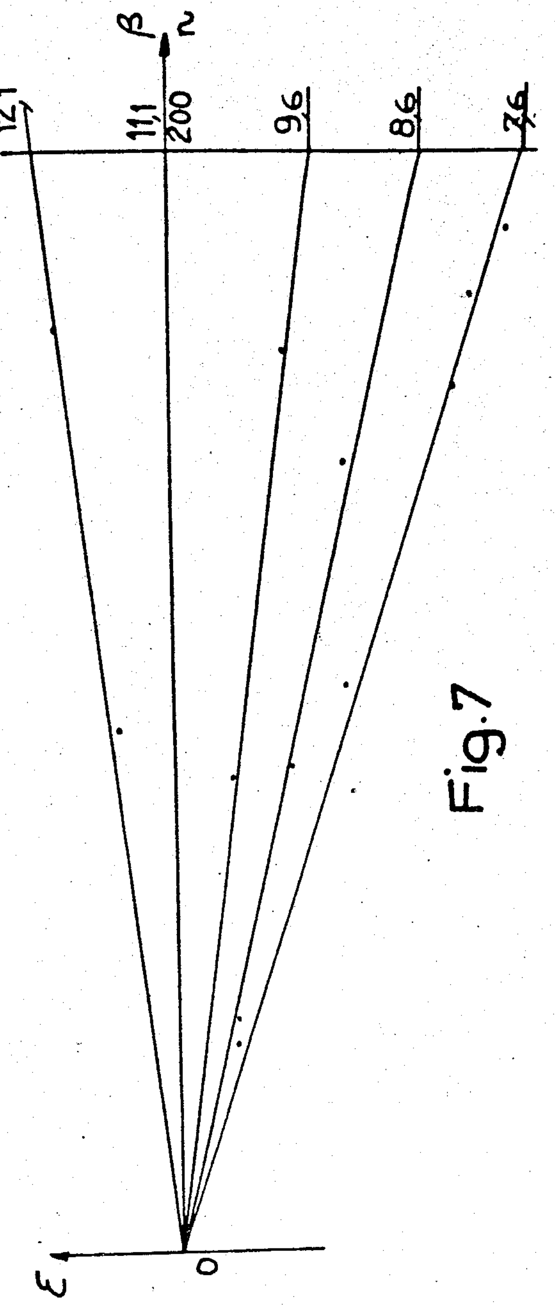
FIG. 7 illustrates a family of curves such as that of FIG. 5, as it appears after correction in accordance with the invention.

FIGS. 6 and 7 respectively illustrate the theoretical and experimental families of curves Σ(β), corrected in accordance with the invention.

It will be seen, in particular, that for the experimental tube to which FIG. 2 relates to the optimum anode voltage is $VA$=11.1 kv. approximately, at which value the error function $\Sigma(\beta)$ coincides with the axis $o\beta$, i.e. at which value the error $\Sigma$ is virtually zero for all values of $\beta$. (In this tube, the dimensions are $L$=20 cm., $D$=2.4 cm., $V_g$=7 kv. and $V_c$=25 kv.).

The manufacture of variable-pitch grids is a delicate operation in all circumstances where the variation in pitch is small as in the numerical example hereinbefore defined.

It is for this reason that the invention provides a general method of producing such grids, which method provides in addition to the frame or matrix on which the grid is generally woven, one or more mountings or combs (preferably two identical combs will be used for the manufacture of one grid).

These initially rectilinear combs are first machined to have a constant-pitch i.e. a constant distance between slots, and then cambered to give them a profile related to the law of pitch variation which it is desired to produce.

During the manufacture of the grid, these combs are maintained in a fixed position in relation to the frame; where two combs are being used, each grid wire passes through the mutually opposite slots in the two combs.

Figure 9:
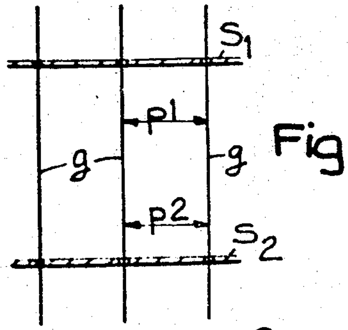
FIGS. 9, 10, 11 and 12 illustrate four examples of arrangements which can be used to produce a variable pitch with a constant-pitch frame.
Figure 10:
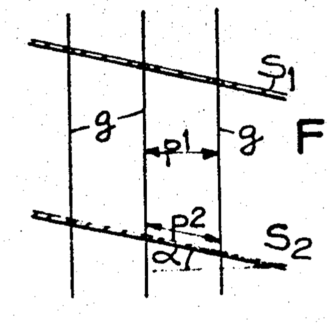

FIGS. 9 and 10 schematically illustrate the variation in pitch produced simply by skewing the rectilinear combs $S_1$ and $S_2$; the pitch $p_1$ of the grid wire $g$, equivalent to the pitch $p_2$ of the combs in the case of FIG. 9, is equal to $p_2 \cos \alpha$ in FIG. 10.

Figure 11:
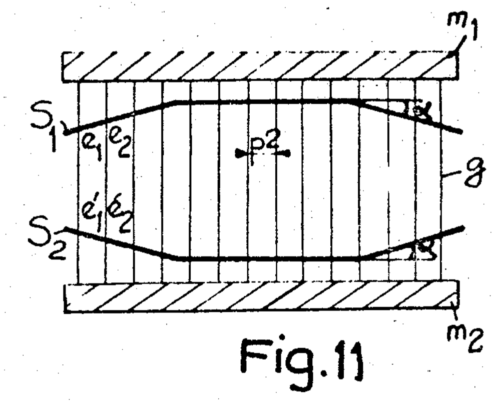

FIG. 11 schematically illustrates the relative dispositions of the various elements in the course of the manufacture of a grid; the grid wires $g$ stretched between the fittings $m_1$ and $m_2$ of the frame, pass through the slots $e$, $e_1$, $e'_2$, ... of the combs $S_1$ and $S_2$ which latter are maintained in a fixed position in relation to the fittings $m_1$ and $m_2$ and inclined at an angle $\alpha$ at their two ends. The pitch of the grid wires $g$ varies from $p_2$, the pitch of the combs, at the center, to $p_2 \cos \alpha$ at the ends.

Figure 12:
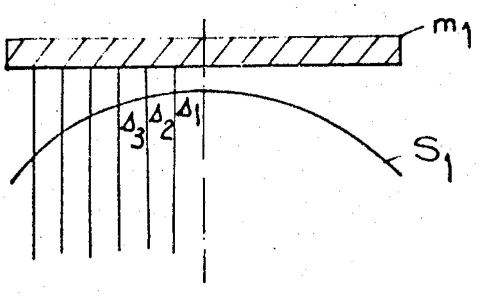

FIG. 12 illustrates another example in which the comb $S_1$ of constant-pitch ($s_1=s_2=s_3$...), curved in a circular arc, is used to produce a grid pitch which varies sinusoidally from the center towards the periphery.

Figure 13:
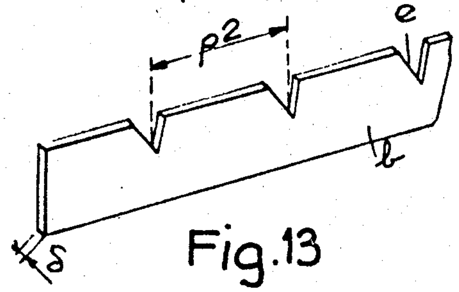
FIG. 13 is an example of a comb used for the manufacture of variable-pitch grids in accordance with the invention.

Finally, FIG. 13 illustrates an embodiment of the combs in accordance with the invention; in the section of a strip $b$ of flexible material there are cut slots $e$ at the bottom of which the grid wires are located at the time of weaving of the grid. The thickness $\delta$ of the strip $b$ should be relatively small so that there is no appreciable variation in pitch $p_2$ at the time of deformation of the strip.

It goes without saying that this method is applicable to the case of grids whose pitch varies in accordance with an arithmetic progression as set out by formula (4). It will be necessary in this case to deform the combs approximately along a curve equation in relation to the two axes of the screen, the horizontal axis being taken as the $x$ axis, is of the form $y=Bx^{3.2}$, $B$ being a constant.

Variable-pitch grids present another advantage: it has been observed that they improve beam focusing and this enables finer spots to be produced upon the screen.

Of course the invention is not limited to the embodiments described and shown which were given solely by way of example.

What is claimed is:

1. In a color television tube comprising three electron guns for emitting beams corresponding to three fundamental colors and a screen of regularly repeated phosphor strips of the same colors of equal and constant width, the improvement comprising:

a single focusing grid comprising a flat grid, disposed parallel to said screen, of wires parallel to said strips, the pitch, P$n$, of said grid varying from the center towards the edges of said tube in accordance with an arithmetic progression as a function of the position number of the grid wires counted from the center whereby the color purity of the tube is maintained over the entire screen by causing the point of electron impact to be within the proper phosphor strip at all screen points between the center and edges thereof, said arithmetic progression being defined by:

$$P_n=P_o-2\frac{\epsilon_1}{N}+2\frac{\epsilon_1}{N^2}n$$

wherein:

$P_o$ is the pitch of a constant-pitch grid which would have the same total number of wires as said variable-pitch grid, $\Sigma_1$ is the maximum interval which said constant-pitch grid would produce between the point of impact of a beam and the center of the phosphor strip of the corresponding color being scanned, and where N designates the position number of the constant-pitch grid wire for which said maximum interval $\Sigma_1$ is produced, $n$ being an integer indicating the position number of the variable-pitch grid wire considered counting from the center wire of the grid.

* * * * *